UNITED STATES PATENT OFFICE.

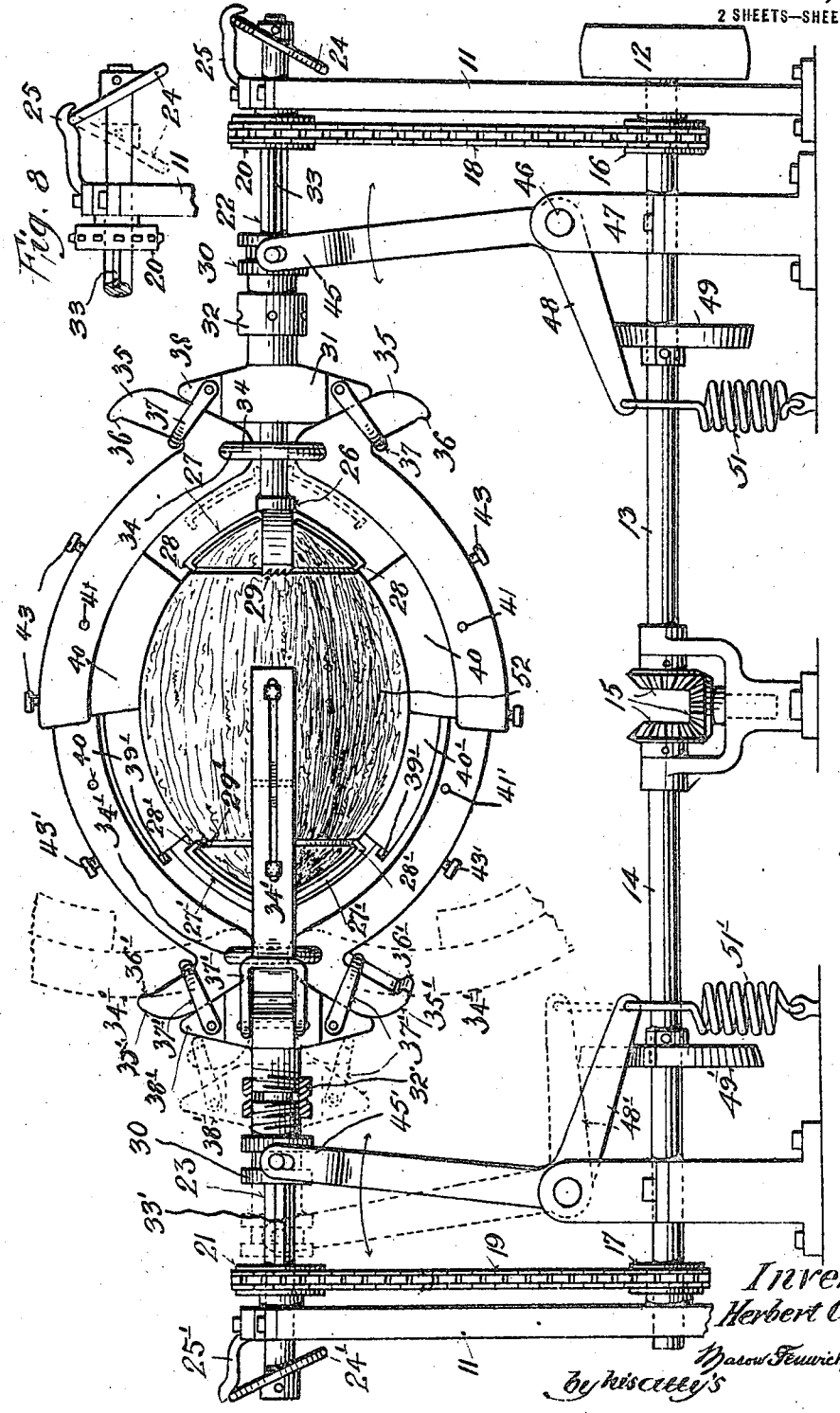

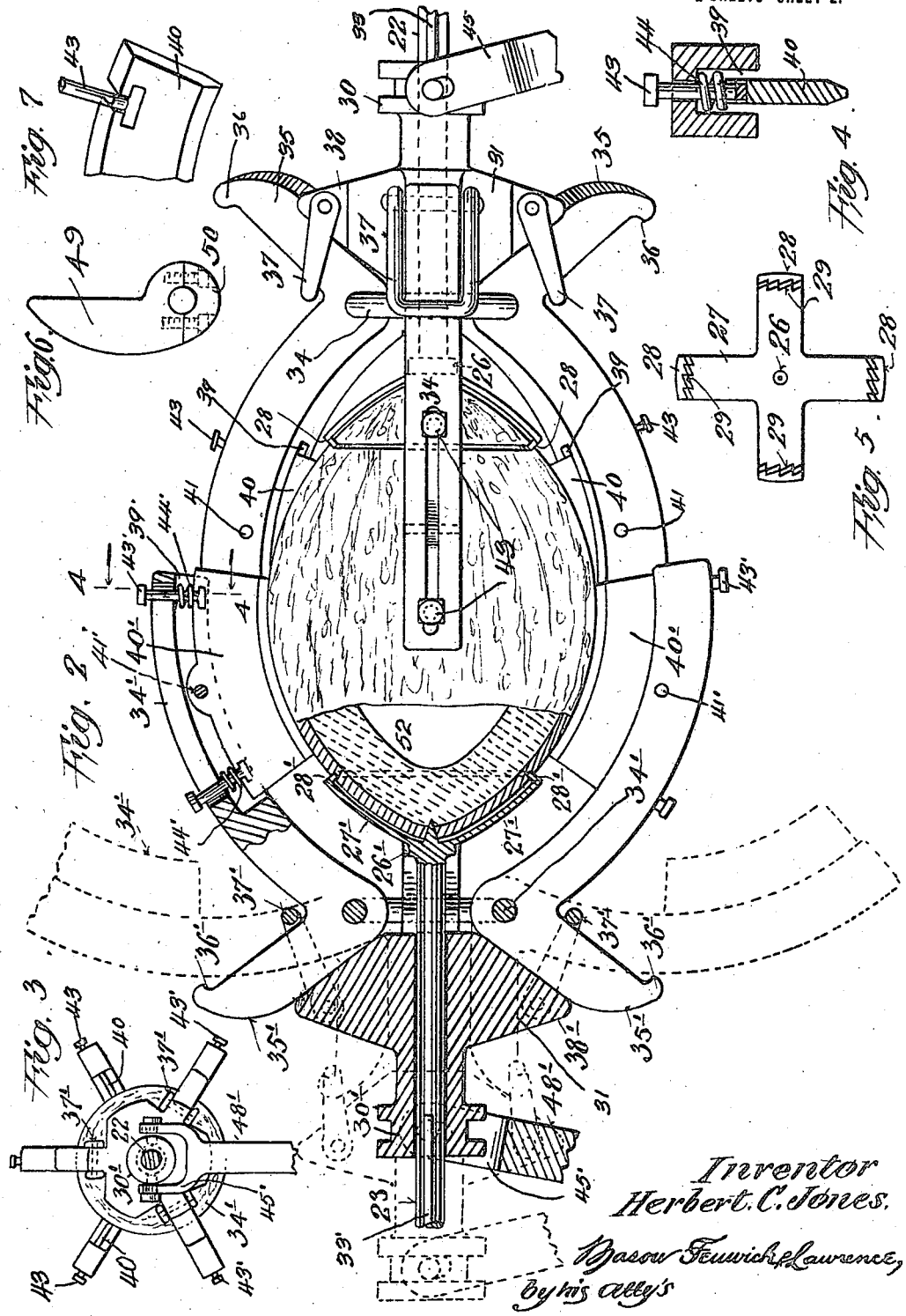

HERBERT C. JONES, OF TOTTENVILLE, NEW YORK, ASSIGNOR TO THE FRANKLIN BAKER COMPANY, OF PHILADELPHIA, PENNSYLVANIA, A CORPORATION OF PENNSYLVANIA.

COCONUT-SHELL-CRACKING MACHINE.

1,402,234.   Specification of Letters Patent.   Patented Jan. 3, 1922.

Application filed March 19, 1919.   Serial No. 283,484.

*To all whom it may concern:*

Be it known that I, HERBERT C. JONES, a citizen of the United States, residing at Tottenville, Staten Island, in the county of Richmond and State of New York, have invented certain new and useful Improvements in Coconut-Shell-Cracking Machines; and I do hereby declare the following to be a full, clear, and exact description of the invention, such as will enable others skilled in the art to which it appertains to make and use the same.

This invention relates to a nut cracking and shelling machine and has particular reference to a machine of this character applicable for cracking and removing the shell of a coconut and the kernel or meaty portion thereof.

As now practiced, the shells of coconuts are cracked and removed from the meat by hand, but the hand operation does not leave the kernel free of all breaks or cuts. A break or cut in the surface of the meat after the shell is removed has a detrimental effect in the further operation of skinning which follows the removal of the shell.

The object of this invention is to provide an apparatus which will remove the shell from the meaty portion of the coconut and reduce to a minimum the possibility of a break or crack in the meaty portion.

A further object is to provide an apparatus which will accomplish the object mentioned and be automatic in operation.

The above objects, as well as others which will be hereinafter disclosed, are accomplished by means of the apparatus shown in the accompanying drawings, in which—

Figure 1 shows a side elevation of the machine with the hammers in cracking position.

Figure 2 shows an enlarged view of the nut holding and cracking means, with parts in section.

Figure 3 shows an end view from the left of Figure 2 looking to the right.

Figure 4 is a sectional view taken on the line 4—4 in Figure 2.

Figure 5 is an end view of the scoring arms of the cup-shaped nut end supporting elements.

Figure 6 is a side elevational view of a detail.

Figure 7 is a perspective view of a part of a cracking blade, and

Figure 8 shows another detailed arrangement.

In the drawings, the numeral 11 indicates two, or as many more as are necessary, supporting standards for the machine. 12 indicates a driven pulley on a shaft 13 having suitable gearing 15 to cause a similar shaft 14 to rotate in a direction opposite to 13. Shafts 13 and 14 are each provided with sprockets 16 and 17 driving chains 18 and 19 taking around sprockets 20 and 21 keyed to shafts 22 and 23, all respectively. Shaft 22 is supported in any desired number of standards 11 and carries at its outer end an inclined cam 24 co-acting with a grooved arm or finger 25 carried by the standard 11. The other or inner end of the shaft 22 is provided with a cup-like member 26 provided with spring arms 27 having inturned ends 28 equipped with up-saw teeth 29, for engaging and scoring the end of the nut to be cracked.

Surrounding the shaft 22 is a grooved collar 30, a conical faced anvil 31 and a nipple 32 connecting the collar and anvil adjustably in that it has right and left-hand threads therein co-acting with similarly handed threads on the collar and anvil. The collar and anvil are slidable longitudinally upon the shaft 22 but the key 33 prevents their rotation thereon. 34 indicates a ring (through which the shaft 22 may slide longitudinally) which pivotally supports a plurality of curved hammer-like elements each having a heel part 35 provided with a toe or lug 36.

The heel parts 35 are connected to the anvil member 31 by means of links 37 pivoted in slots 38 in the anvil. The hammers are slotted at 39 at their free ends to receive rocking curved blades 40 pivoted at 41 in the hammers. The blades are provided with T-shaped recesses on their top near their ends adapted to receive headed bolts 43 passing through the hammer and surrounded by a spring 44 between the blade and hammer. The edges of the blades may be any shape, sharp or blunt, depending on the character of the nut to be cracked.

The collar 30 has co-acting with its groove a yoked lever 45 to slide the collar and anvil along the shaft 20. The lever is pivoted at 46 in a support 47 and has an offset arm 48 adapted to be moved upwardly by a cam 49 on shaft 13 having removable base 50, (Figure 6) and to be returned to downward position by a spring 51.

Parts numbered 24 to 51 find their counter-parts in parts numbered 24' to 51', they being on the other side of the machine and oppositely directed to these just described. 52 represents a coconut in place to be cracked. Nuts may be fed to the machine by any desired conveyor from the box where they are steamed.

The operation of the device is as follows:—

Assuming that the hammer elements on both sides of the machine are open as shown in dotted lines at the left of Figures 1 and 2, and the cup elements 26 are retracted as shown in dotted lines at the right of Figure 1, a steam coconut is fed from the steam box to the cracking machine by any suitable conveyor until it reaches cracking position. Continued rotation of the driven shaft 14 rotates the cam 49' out of a position upholding the arm 48', so that the spring 51' acts thereon to slide forwardly the yoked lever 45', the collar 30' and the anvil 31', the movement of the latter forcing the hammer elements to strike the coconut a sharp blow due to the contact of its coned faces with the heel of the hammer elements. At the same time by means of the chain 19 and sprocket 21, the shaft 23 is rotated and the inclined cam 24' in rotating causes the shaft 23 to move inwardly whereby the cup element 26' engages the end of the coconut and as the shaft 23 and the cupped member 26' continue to rotate, the cutting teeth 29' on the cup score the coconut. As soon as a blow is struck by the hammers, continued rotation of the shaft 14, by means of the cam 49' moves the arm 48' upwardly which, in turn, retracts the collar 30' and anvil 31' which by means of the links 37' acting upon the heel 35' of the hammers withdraw them to open position as shown in dotted lines. Whereupon continued rotation of the shaft 23 by means of the inclined cam 24' withdraws this shaft which in turn, withdraws the cup member 26' from the end of the coconut but because the fingers 27' of the cup 26' are spring fingers and because their teeth 29' engage with the score in the end of the coconut, when the cup 26' is retracted it pulls with it one-half of the broken shell from the coconut. The operation described is equally true of and is simultaneously carried out by the corresponding elements on the other side of the machine.

The score of the ends of the coconut must be only sufficient to give the teeth a grip to pull the shell off the nut when the cup is retracted and must not cut through to injure the meat. The curved blades 40 and 40' are made to rock in order to accommodate themselves to relatively large and small nuts which have different contours, some being more rounded than others. After the nut is shelled, it drops down to any suitable conveyor to take it to an adjacent machine for the next operation.

What I claim is:

1. A nut cracking machine having cup-like members for supporting the ends of the nut to be cracked, hammer elements extending on each side of the middle of the nut to be cracked and between said members, and means for causing said hammers to strike a blow directly upon the nut.

2. The device of claim 1 in which the hammer elements are provided with blades adapted to contact with the nut when a blow is struck by the hammers.

3. The device of claim 1 in which the hammer elements are provided with curved blades to contact with the nut when a blow is struck by the hammers.

4. The device of claim 1 in which the hammer elements are provided with pivoted blades adapted to contact with the nut when a blow is struck by the hammers.

5. The device of claim 1 in which the hammer elements are provided with curved rocking blades adapted to contact with and adapt themselves to the curvature of the nut when a blow is struck by the hammers.

6. The device of claim 1 in which the cup-like members have inturned teeth for gripping the nut.

7. The device of claim 1 in which the cup-like members are provided with cutting edges, and means for rotating one member in a direction different from the direction of the one member, whereby the cutting edges will score the ends of the nut.

8. The device of claim 1 in which the cup-like members are provided with spring arms, and cutting teeth on said arms.

9. A nut cracking machine having means for supporting the ends of a nut, means for scoring the ends of a nut, oscillating hammer elements adapted to strike a blow upon the nut, means coacting with the free ends of the oscillating hammer elements to actuate same, means coacting with the scoring members to axially move same in opposite directions to embrace the nut, and means for imparting reciprocal movement to the coacting members.

10. A nut cracking machine having cup-like members for supporting the ends of a nut, pivoted hammer elements for striking the nut a blow, automatic means for rotating the cup-like members in alternate directions to score the ends of the nut, automatic means for causing the hammer elements to strike the nut a blow and to retract the hammers from the nut, and automatic means for moving the cup-like members apart to drop the nut.

11. A method of cracking a coconut consisting in steaming the nut, scoring its ends and hitting the nut a plurality of hammer blows about its middle periphery to crack the shell, and then pulling the shell off the nut by means of the scores on the ends thereof.

12. A nut cracking machine having spring actuated scoring arms for supporting the ends of a nut, hammer elements provided with blades adapted to conform to and contact with the nut when a blow is struck by the hammers and means co-acting with the free ends of the hammer elements for actuating the hammers to strike a blow upon the nut and then to be retracted from the nut.

13. The device of claim 12 in which the co-acting means are automatically operated.

14. The device of claim 12 in which the co-acting means are reciprocal.

15. The device of claim 12 in which the co-acting means comprise reciprocal conical-faced collars, and links between the collars and free ends of the hammers.

16. The device of claim 12 with means for regulating the blow of the hammers.

17. A nut cracking machine having means for supporting the ends of a nut, spring arms, having cutting edges, upon the supporting means, hammer arms adapted to strike blows upon the shell of the nut to crack same, and means for releasing the nut after the cracking operation.

18. A nut cracking machine having axially and oppositely disposed means for supporting the ends of a nut, spring arms, having cutting edges, upon the supporting means, means provided for oppositely rotating the oppositely disposed supporting means, hammer arms adapted to strike blows upon the shell of the nut to crack same and means for releasing the nut after the cracking operation.

19. A nut cracking machine having spring arm holding members for supporting the ends of the nut to be cracked, pivoted hammer elements extending on each side of the middle of the nut to be cracked, and means for causing said hammers to strike a blow upon the nut.

20. The device of claim 19 in which the hammer elements are provided with blades adapted to contact with the nut when a blow is struck by the hammers.

21. The device of claim 19 in which the hammer elements are provided with curved blades to contact with the nut when a blow is struck by the hammers.

22. The device of claim 19 in which the hammer elements are provided with pivoted blades adapted to contact with the nut when a blow is struck by the hammers.

23. The device of claim 19 in which the hammer elements are provided with curved rocking blades adapted to contact with and adapt themselves to the curvature of the nut when a blow is struck by the hammers.

24. The device of claim 19 in which the spring arm holding members have inturned teeth for gripping the nut.

25. The device of claim 19 in which the spring arm holding members are provided with cutting edges, and means for rotating one member in a direction different from the direction of the other member, whereby the cutting edges will score the ends of the nut.

26. The device of claim 19 in which the spring arm holding members are provided with spring actuated arms, and cutting teeth on said arms.

27. A nut cracking machine having means for supporting the ends of a nut, hammer elements pivoted intermediate their ends, and means coacting with the free ends of the hammer elements for causing the hammers to strike a blow directly upon the nut and then be retracted from the nut.

28. A nut cracking machine having means for supporting the ends of the nut to be cracked, a plurality of radially arranged members and means for actuating said members to cause a series of blows to be struck directly on the nut.

29. A nut cracking machine having means for supporting the ends of the nut to be cracked, a plurality of radially arranged hammer elements about the nut and means for causing said hammer elements to impart a series of blows directly upon the supported nut.

30. A nut cracking machine having means for gripping the end portions of the nut and means for causing a series of oppositely directed blows upon the exposed portions of the nut.

31. A method of shelling a nut which consists in gripping the opposite end portions of the nut, directly striking the shell with a series of blows to crack the same, and then pulling the cracked shell off the nut by the end grippers.

In testimony whereof I affix my signature.

HERBERT C. JONES.